United States Patent [19]

Sekmakas et al.

[11] 4,195,147
[45] Mar. 25, 1980

[54] PREPARATION OF CATIONIC AMINE-FUNCTIONAL COPOLYMERS

[75] Inventors: Kazys Sekmakas, Palatine; Raj Shah, Schaumburg, both of Ill.

[73] Assignee: DeSoto, Inc., Des Plaines, Ill.

[21] Appl. No.: 14,101

[22] Filed: Feb. 22, 1979

[51] Int. Cl.² ............... C08F 2/06; C08F 220/58
[52] U.S. Cl. ............... 526/312; 204/181 C; 260/29.6 HN; 260/32.8 N; 260/33.4 R; 526/208; 526/209; 526/212; 526/213; 526/216; 526/233; 526/304
[58] Field of Search ........... 204/181 C; 260/29.6 HN, 260/32.8 N, 33.4 R; 526/213, 216, 208, 209, 212, 233, 304, 312

[56] References Cited

U.S. PATENT DOCUMENTS

| | | | |
|---|---|---|---|
| 3,446,723 | 5/1969 | Pohlemann et al. | 204/181 C |
| 3,454,482 | 7/1969 | Spoor et al. | 204/181 C |
| 3,455,806 | 7/1969 | Spoor et al. | 204/181 C |
| 3,458,420 | 7/1969 | Spoor et al. | 204/181 C |
| 3,928,157 | 12/1975 | Suematsu et al. | 260/29.6 HN |
| 3,985,698 | 10/1976 | Matsudaira et al. | 260/29.6 HN |
| 4,085,020 | 4/1978 | Sekmakas | 204/181 C |
| 4,096,105 | 6/1978 | McGinniss | 260/29.6 HN |
| 4,116,787 | 9/1978 | Gatechair | 260/29.6 HN |

*Primary Examiner*—John Kight, III
*Attorney, Agent, or Firm*—Dressler, Goldsmith, Clement, Gordon & Shore, Ltd.

[57] ABSTRACT

The preparation of water dispersible amine-functional copolymers is disclosed in which a mixture of ethylenically unsaturated material including amine-functional monomer is slowly added to a heated heel of water miscible organic solvent containing a solubilizing acid in an amount to neutralize from 25% to 90% of the amine functionality in the copolymer, but insufficient to provide a pH below 5 when the copolymer is dispersed in aqueous medium.

15 Claims, No Drawings

PREPARATION OF CATIONIC AMINE-FUNCTIONAL COPOLYMERS

DESCRIPTION

Technical Field

This invention relates to the preparation of cationic amine-functional copolymers which can be dissolved or dispersed in water.

Background Art

Amine-functional copolymers are usually formed by the copolymerization of monoethylenic monomers including the amine functional monomer in organic solvent solution. The resulting amine copolymers are then reacted with a solubilizing acid to make them cationic and dispersible in water, but the distribution of the amine monomer in the copolymer is poor and the dispersions are unstable, so electrocoating performance degrades with time. If the amine monomer is used in salt form, then the aqueous dispersions are too acidic. This invention modifies the copolymer preparation to provide aqueous baths of greater stability at a pH which is closer to neutral (pH 7). In this way electrocoating performance remains satisfactory for a prolonged period of time.

Disclosure of Invention

In this invention, the amine monomer is neutralized from 25% to 90% with a solubilizing acid and is copolymerized with other monoethylenically unsaturated monomers in organic solvent solution in the presence of the acid to form a soluble copolymer. The greater the extent of neutralization during copolymerization, the more uniform the copolymer, but the lower the pH of the aqueous bath containing the copolymer. One uses as much solubilizing acid as possible while avoiding a pH under 5 when the copolymer is dispersed in aqueous medium.

In preferred practice, the solubilizing acid is dissolved in a portion of the organic solvent, and the monomers, preferably in admixture with one another and the selected free radical polymerization catalyst, are added slowly to the heated solution of solubilizing acid in organic solvent. This means that the proportion of acid is present in excess at the beginning and is reduced as polymerization proceeds. This yields the best polymers with the smallest proportion of neutralization in the final copolymer product.

As another feature of the invention, the procedure described above leads to the provision of aqueous baths in which the ratio of organic solvent to water is minimized, which is clearly desirable.

The monoethylenically unsaturated monomers which are copolymerized with the amine monomer may vary considerably, and appropriate selections are well known to the art. Various monomers known as nonreactive monomers because they do not react except through their unsaturation during copolymerization or subsequent cure are desirably present, and these are illustrated by styrene, venyl toluene, methyl methacrylate, methyl acrylate, ethyl acrylate, n-butyl and isobutyl acrylate or methacrylate, dibutyl maleate, acrylonitrile, and the like.

Reactive monomers are also desirably present, and these will include amides, such as acrylamide, N-methylol monomers, such as N-methylol acrylamide and lower alkyl ($C_1$–$C_8$) ethers thereof, and hydroxy monomers illustrated by hydroxy alkyl acrylates and methacrylates in which the alkyl group normally contains from 2-4 carbon atoms. Hydroxy ethyl acrylate supplies a primary hydroxy group and is preferred. These reactive monomers may constitute from 5% to 40%, preferably from 10% to 30%, of the weight of the copolymer.

Polyethylenically unsaturated copolymerizable materials may also be present so long as they do not prevent the achievement of a solvent-soluble, nongelled copolymer as taught in our prior U.S. Pat. No. 4,085,020.

The amine monomers which may be used are also well known. Dimethyl aminoethyl methacrylate will be used as illustrative, however any monoethylenically unsaturated copolymerizable amine, be it primary, secondary or tertiary, may be used herein. The tertiary amines are preferred and are most available. Other suitable amine monomers are illustrated by dimethyl aminopropyl methacrylate, monomethyl aminoethyl methacrylate, aminoethyl methacrylate, and the corresponding acrylates, crotonates and the like. The amino amides are also quite useful, as illustrated by dimethylaminopropyl methacrylamide.

The proportion of the amine monomer in the copolymer is subject to considerable variation, but from 5% to 35%, preferably from 10% to 25%, based on the weight of the copolymer, illustrates usual practice.

The copolymerization in organic solvent solution is conventional in most respects in that the organic solvent dissolves the monomers and the copolymer product and the reaction is carried out with the aid of moderate heat and a free radical-generating polymerization catalyst such as azobisisobutyronitrile, benzoyl peroxide, and cumene hydroperoxide. While chain termination agents such as alkyl mercaptans can be used, such agents are preferably absent since the amine monomer is itself an inhibitor of the desired copolymerization.

The organic solvent medium is preferably selected to be a water miscible organic solvent which is desirably used in as small an amount as is consistent with avoiding excessive viscosity in the copolymer solution. This also helps to maximize the molecular weight. The proportion of organic solvent during the copolymerization reaction may range from 15% to 150% of the weight of the unsaturated material subjected to polymerization, preferably from 20% to 50% on the same basis. After polymerization has been completed or is almost over, more solvent can be added to lower viscosity, but in preferred practice the copolymer solution which is dispersed in the aqueous medium contains from 30% to 100% of solvent based on the copolymer, preferably 35% to 60%, on the same basis. 2-butoxy ethanol is a particularly preferred solvent in accordance with the invention, but many others may be used such as ethanol, isopropanol, 2-ethoxy ethanol, methyl ethyl ketone, and the like.

While it is broadly possible to use the amine monomer in the form of an amine salt, this would normally involve the use of an excessive proportion of solubilizing acid so as to produce an aqueous bath which is too low in pH. In the preferred practice of this invention, the pH of the aqueous bath which is produced should range from pH 5 to about pH 7.5, preferably from pH 5.5 to pH 7. This means that the amount of solubilizing acid which is used in the invention should not exceed 90% of the amount needed for complete neutralization of the amine monomer, and is preferably not in excess of 75% of that amount. The preferred neutralization stoichiometry used herein is from 25% to 70%, though this will depend in part upon the strength of the acid which is selected. The preferred acids are organic acids, such as acetic acid, glycollic acid and, most preferably, dimethylol propionic acid. However, inorganic acids which do not damage the deposited film, like phosphoric acid, are also useful. Acids which vaporize or decompose are particularly contemplated since it is usually best not to have the acid present in the final cured coating.

A prime feature of this invention is to start with a preheated "heel" of organic solvent containing most or all of the solubilizing acid and to add the monomers in admixture with one another so that the amine monomer is brought into the system in increments with the proportion of solubilizing acid being high at the start and progressively smaller as the polymerization reaction proceeds. In this way there is excessive acid at the start when incorporation of the amine monomer is most difficult, and a deficiency of acid at the end when the problem of amine distribution in the copolymer has been resolved. At the same time, the acid concentration is high when it is not involved in any aqueous bath where excessive acidity introduces corrosion difficulties, and there is a deficiency of acid in the copolymer product where it provides a water soluble product at a pH close to neutral.

The invention is illustrated in the following example:

BEST MODE FOR CARRYING OUT THE INVENTION

EXAMPLE

| Grams | Component |
| --- | --- |
| 250 | 2-butoxy ethanol |
| 70 | Dimethylol propionic acid |

The above are charged to a reactor and heated to 95° C. to form a heel of solution in which the polymerization is carried out.

| Grams | Component |
| --- | --- |
| 335 | Styrene |
| 180 | 2-hydroxy ethyl acrylate |
| 165 | Dimethyl aminoethyl methacrylate |
| 315 | Butyl acrylate |
| 18 | azobisisobutyronitrile |

The above are premixed and added to the heel of acid-containing solvent slowly over a 3 hour period while maintaining 90° C. When this addition is finished, most of the polymerization has been completed and excessive viscosity is avoided by adding 150 grams of 2-butoxy ethanol. Then, and to insure completion of reaction, 3 grams of azobisisobutyronitrile is added and the temperature is maintained at 90° C. for one hour, and this procedure is repeated two more times at which point the conversion of monomer to polymer is complete and 90 grams of 2-butoxy ethanol is added to thin the solution. 2400 grams of deionized water is then added with rapid agitation to provide an aqueous bath having a nonvolatile content of 26.5%, a pH of 6.8 and an amine value (theoretical) of 58 based on solids. The bath is a milky dispersion, and it is stable.

It will be observed that long term stability is provided at an almost neutral pH, and despite a 26.5% resin solids content, there are only 17 parts of solvent for every 83 parts of deionized water. The more solvent, the easier the burden of dispersing the copolymer in the water, but the cost and pollution burden mounts with the solvent content.

Electrodeposition at the cathode after dilution to 10% solids content proceeds excellently, and the performance is substantially constant for many months. This is not possible in the absence of this invention.

If this example were repeated omitting the 70 grams of dimethylol propionic acid from the polymerization, then the copolymerization would proceed to a much higher viscosity as the nonamine functional monomers polymerize separately. The resulting copolymer with unsatisfactory distribution of amine functionality needs much more acid to disperse it in water, and the pH would be below 5. Moreover, dilution with water to 10% solids followed by cationic electrodeposition causes preferential deposition of the polymer fragments with the higher amine content, so the deposition voltage changes with continued deposition and the product characteristics also changes with time which is not commercially acceptable. Also, the bath might appear stable, but its electrodeposition characteristics changes in a few weeks of mere storage with circulation but without electrodeposition, and this establishes an important instability.

If this example were repeated by using the dimethylol propionic acid in the monomer premix, then the result would be better than if the acid were added after copolymerization, but it would not be as good as in the example. More acid would be needed for a stable bath, so the pH of the bath would be lower. Also, the less satisfactory amine distribution causes a change in electrodeposition performance with time.

We claim:

1. A method of producing water dispersible amine-functional copolymers comprising copolymerizing monoethylenically unsaturated monomers including amine-functional monomer in organic solvent solution in the presence of a solubilizing acid in an amount to neutralize from 25% to 90% of the amine functionality in the copolymer.

2. A method as recited in claim 1 in which said amine monomer is present in an amount of from 5% to 35% of the weight of the copolymer, and the proportion of acid is insufficient to provide a pH below 5 in aqueous medium.

3. A method as recited in claim 1 in which said copolymer consists essentially of monoethylenically unsaturated monomers which include from 10% to 25% of tertiary amine monomer, and said organic solvent is water miscible.

4. A method as recited in claim 3 in which said organic solvent is 2-butoxy ethanol.

5. A method as recited in claim 1 in which said monomers include from 5% to 40% of reactive monomers.

6. A method as recited in claim 5 in which said reactive monomer is hydroxy alkyl acrylate or methacrylate in which the alkyl group contains from 2-4 carbon atoms.

7. A method as recited in claim 6 in which said reactive monomer is hydroxy ethyl acrylate.

8. A method as recited in claim 1 in which said copolymerization is carried out in the absence of chain terminating agents.

9. A method of producing water dispersible amine-functional copolymers comprising slowly adding a mixture of ethylenically unsaturated material comprising monoethylenically unsaturated monomers including amine-functional monomer in an amount of from 5% to 35% of the weight of said unsaturated material to a heated heel of water miscible organic solvent containing a solubilizing acid in an amount to neutralize from 25% to 90% of the amine functionality in the copolymer, but insufficient to provide a pH below 5 when the copolymer is dispersed in aqueous medium.

10. A method as recited in claim 9 in which said copolymer consists essentially of monoethylenically unsaturated monomers which include from 10% to 25% of tertiary amine monomer, and said organic solvent is used in an amount of from 20% to 50% of said unsaturated material.

11. A method as recited in claim 10 in which said copolymerization is carried out in the absence of chain terminating agents.

12. A method as recited in claim 11 in which said amine monomer is a tertiary amine used in amount of 10% to 30% of the copolymer and said monomers include from 5% to 40% of reactive monomers.

13. The product of the method of claim 1.

14. The product of the method of claim 9.

15. The product of the method of claim 12.

* * * * *

Disclaimer 4,195,147.—*Kazys Sekmakas*, Palatine and *Raj Shah*, Schaumburg, Ill. PREPARATION OF CATIONIC AMINE-FUNCTIONAL COPOLYMERS. Patent dated Mar. 25, 1980. Disclaimer filed May 29, 1981, by the assignee, *DeSoto, Inc.*

Hereby enters this disclaimer to claims 1–8 of said patent.

[*Official Gazette August 11, 1981.*]